(12) United States Patent
Miyazaki et al.

(10) Patent No.: US 6,416,828 B1
(45) Date of Patent: Jul. 9, 2002

(54) CONTAINERS MADE FROM WOOD CHIPS

(76) Inventors: Kouji Miyazaki, 1678-24, Nishikuniyoshi, Ichihara-city, Chiba 290-0231; Noboru Yamamoto, 300-1, Tajima, Tomioka-city, Gunma, 370-2454, both of (JP)

( * ) Notice: Subject to any disclaimer, the term of this patent is extended or adjusted under 35 U.S.C. 154(b) by 132 days.

(21) Appl. No.: 09/590,225

(22) Filed: Jun. 8, 2000

(30) Foreign Application Priority Data

Jun. 9, 1999 (JP) ............................................ 11-161752

(51) Int. Cl.[7] ................................................. B65D 3/00
(52) U.S. Cl. .................... 428/34.1; 428/292.4; 229/406; 220/574; 220/62.11; 220/62.13; 220/62.2; 206/524.1
(58) Field of Search ...................... 428/292.4; 229/406; 206/524.1; 220/574, 62.11, 62.13, 62.2

(56) References Cited

U.S. PATENT DOCUMENTS 4,781,321 A * 11/1988 Koyata et al. ............ 229/1.5 B

FOREIGN PATENT DOCUMENTS

IT 713015 B * 1/1964

* cited by examiner

Primary Examiner—C. Melissa Koslow
Assistant Examiner—Ahalie Manlove
(74) Attorney, Agent, or Firm—Richard M. Goldberg

(57) ABSTRACT

Containers made from wood chips 11 are made by forming a wall by pressing together wood chips 11 mixed with a water-insoluble adhesive 4. The wall permits infiltration of a liquid from at least one surface thereof and holds the liquid inside. The containers are suited for use as food bowls having a heat-insulating quality and as flower pots providing an automatic continuous feed of water. The wood chips used as the material are obtained by crushing particles of wood resulting from lumbering into smaller pieces.

8 Claims, 2 Drawing Sheets

CONTAINERS MADE FROM WOOD CHIPS

BACKGROUND OF THE INVENTION

This invention relates to containers made from wood chips suited for use as food bowls, flowerpots and the like.

Wood chips resulting from the production of lumber are generally disposed of as waste or, at best, ground and used as animal feeds. No more prudent industrial use has been made of wood chips than to produce filamentous wood chips for use for pillows, mats and the like.

The Inventor invented a process for producing filamentous wood chips and obtained a patent therefor (Japanese Patent No. 2087392. The invention was made in collaboration with Mr. Kouji Miyazaki as in the case of the present invention.) However, no attempts have been made to use such filamentous wood chips as the material for containers.

The object of this invention is to provide containers made from filamentous wood chips that have been unobtainable by conventional technologies.

SUMMARY OF THE INVENTION

This invention offers a solution to the above problem by making containers from wood chips by pressing together wood chips mixed with a water-insoluble adhesive, with provisions made to allow liquids to infiltrate into the wall at least from one surface thereof.

DETAILED DESCRIPTION OF THE INVENTION

Figure 4:
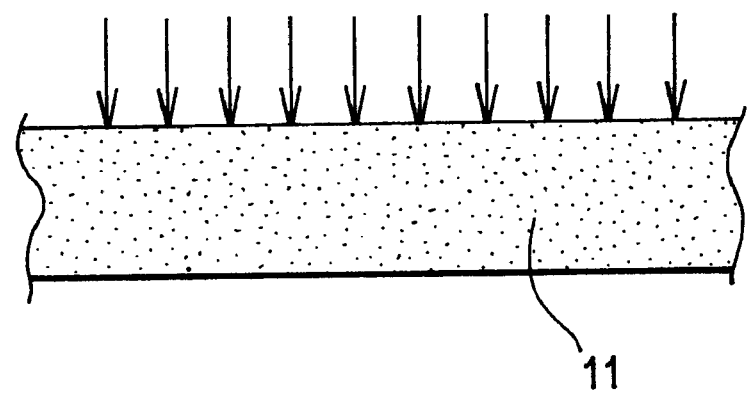
FIG. 4 is a cross-sectional view showing how the wall of a container according to this invention is formed by pressing together wood chips.

The wall of a container 1 is made by pressing together a mixture of wood chips 11 and an adhesive as shown in FIG. 4.

Although the size of the wood chips 11 is not specifically defined, it is preferable that each chip is 0.5 to 2 mm in thickness and 0.25 to 9.00 cm$^2$ in area.

This means that the average unit volume of the wood chips making up the container 1 should preferably be in an appropriate range. As the average unit volume decreases, adherence of individual wood chips to one another becomes weaker. As the average unit volume increases, by contrast, surface smoothness of the wall tends to be lost.

Although the mixing ratio of the adhesive and wood chips 11 and the pressure to be applied for pressing them together depend on the thickness of the container walls they need not be limited to any specific range.

To obtain a wall thickness of 1 cm, however, it is appropriate, from the experience of the inventor, to apply a pressure of approximately 3 tons per square centimeter.

The adhesive may be selected from epoxy, polyimide, melamine, urea and other synthetic resin adhesives.

Containers according to this invention must have such pores as will permit water 4 to infiltrate into at least one wall surface thereof through capillarity that constitutes a first feature thereof as described below.

A first feature of the containers made from wood chips according to this invention is their lightweight that is due to the fact that the chips are of wood and the presence of fine pores provide capillarity on the inside.

A second feature is that the wood chips used as the material for containers according to this invention are inexpensive and permit recycling of the material. Even when the containers are discarded, they can be crushed to pieces and used as, for example, soil enrichment because they are primarily composed of the wood chips 11.

A third feature is that the containers according to this invention give off the characteristic smell of wood since they are made of wood chips and at least one surface of their walls thereof is exposed.

The features of the containers according to this invention are not limited to those described above.

Now details of this invention will be described by reference to some embodiments thereof.

Embodiments

Figure 1:
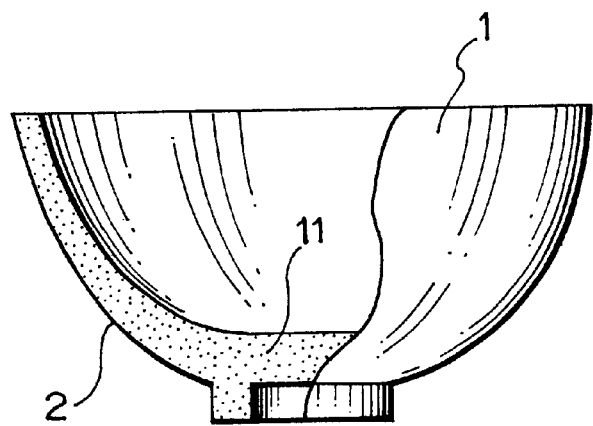
FIG. 1 is a cross-sectional side elevation of a first embodiment of this invention for use as a food bowl.

A first embodiment of this invention is a food bowl that comprises a container 1 whose outer surface comprises a water impermeable coating as shown in FIG. 1.

The water impermeable coating 2 comprises a synthetic resin. The pores in the wall of the food bowl 1 that provide capillarity have a heat-insulating effect that reduces or prevents the transfer of heat to the outside wall of the food bowl.

In the first embodiment serving as a food bowl, the pressed wood chips 11 are exposed on the inner surface. Thus, the wood chips 11 give off the characteristic smell of wood and, when a beverage is poured therein, add to the flavor of the beverage.

When, for example, sake (Japanese wine made from fermented rice) is poured into a container made from chips of Japanese cedar, the sake will have a stronger fragrance of Japanese cedar than when it is stored in a barrel of Japanese cidar.

Figure 2A:
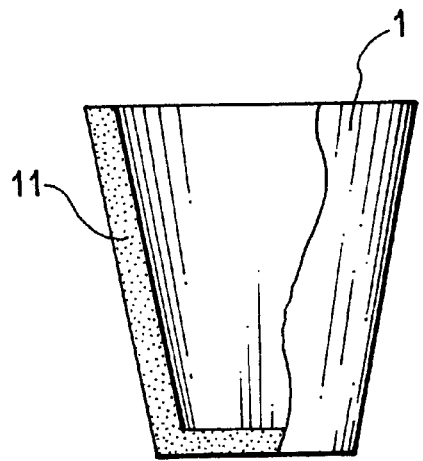
FIG. 2 shows a second embodiment of this invention serving as a flowerpot. (a) is a partial cross-sectional side elevation of the flower pot and (b) is a side elevation of the flower pot with a partial; cross-sectional side elevation of a container to supply water.

A second embodiment of this invention is a flower pot that comprises of a container with no waterproof coating on both the inner and outer surfaces thereof, as shown in FIG. 2(a).

Plants grown in flower pots generally require watering at certain intervals.

Figure 2B:
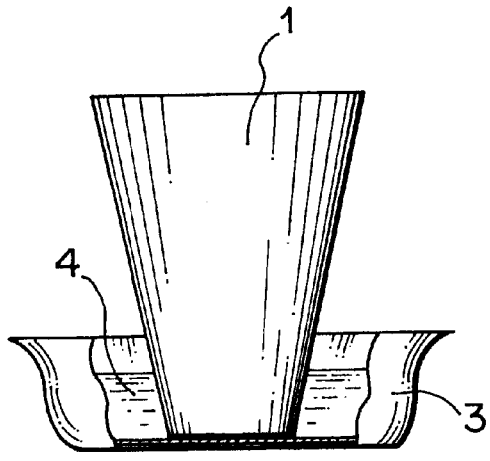

The second embodiment of this invention provides a continuous supply of water 4 required by the plant grown therein by capillarity action through the wall thereof when the container 1 is placed in a dish or other container 3 holding water 4, as shown in FIG. 2(b).

If the size and wall thickness appropriate for the kind of plant grown is selected, the container 1 of this invention serving as a flower pot provides an automatic continuous feed of water, thereby eliminating the need for periodic watering.

Figure 3:
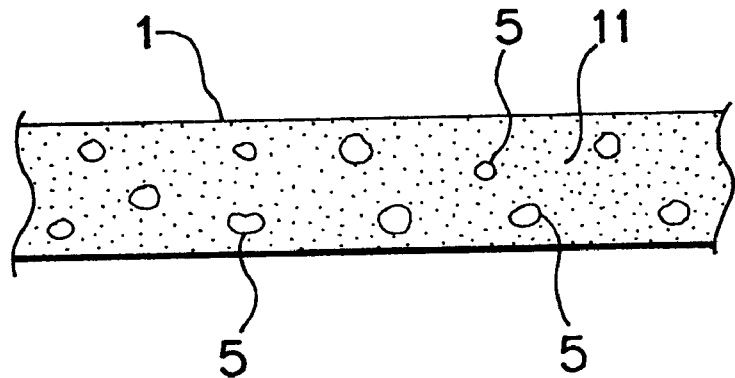
FIG. 3 is a cross-sectional view of a third embodiment of this invention.

A third embodiment of this invention shown in FIG. 3 is made from a mixture of wood chips 11 with at least one of chaff, powder charcoal, and other similar substances 5.

Wood chips mixed with chaff 5 and the like permit making containers 1 with a greater percentages of pores and, hence, of lighter weight.

Powder charcoal 5 permits can either an increase or a decrease in the percentage of pores, depending on the sizes of the charcoal particles. Normally, powder charcoal 5 reduces the percentage of pores because the average cubic volume thereof is smaller than that of wood chips 11. In addition, the powder charcoal 5 mixed with the wood chips exhibits its natural cleaning and filtering actions.

The containers 1 according to this invention can be used mainly as food bowls and flower pots. Because of the versatile operations and effects described above and by reference to the first, second and third embodiments, the containers 1 according to this invention are of great value.

What is claimed is:

1. A container made from walls comprising wood chips in which the walls are made by pressing together wood chips mixed with at least one of chaff and powder charcoal, and with a water-insoluble adhesive, wherein the walls include at least one surface thereof which is permeable to liquid.

2. A container made from wood chips according to claim 1, wherein the average thickness and area of the wood chips is from 0.5 to 2 mm and the average area of the wood chips is from 0.25 to 9.0 cm$^2$.

3. A container made from wood chips according to claim 1, wherein the outer surface of the container wall is covered with a film of waterproof coating.

4. A container made from wood chips according to claim 1, in which each wall includes an inner and outer surface, and both the inner and outer surfaces of the walls are permeable to liquid.

5. A container of claim 3 wherein the liquid comprises water.

6. A container of claim 4 wherein the liquid comprises water.

7. A container of claim 1 wherein the water insoluble adhesive comprises a synthetic resin.

8. A container of claim 2 wherein the water insoluble adhesive comprises a water insoluble synthetic resin.

\* \* \* \* \*